June 24, 1930. A. H. DIXON ET AL 1,768,462
METHOD OF MAKING SHREDDERS
Filed Oct. 21, 1929

Albert H. Dixon,
Ferdinand A. Henschell
and Thomas Simpson Robson
INVENTORS

BY *Victor J. Evans*
ATTORNEY

Patented June 24, 1930

1,768,462

UNITED STATES PATENT OFFICE

ALBERT H. DIXON AND THOMAS SIMPSON ROBSON, OF SEATTLE, WASHINGTON, AND FERDINAND A. HENSCHELL, OF VANCOUVER, BRITISH COLUMBIA, CANADA

METHOD OF MAKING SHREDDERS    REISSUED

Application filed October 21, 1929. Serial No. 401,268.

This invention relates to a method of forming cutting teeth in a vegetable and fruit shredder or the like, the general object of the invention being to form the teeth with beveled cutting edges, so that the teeth will cut articles with the minimum amount of resistance.

Another object of the invention is to so arrange the parts that they can be formed by dies.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1:
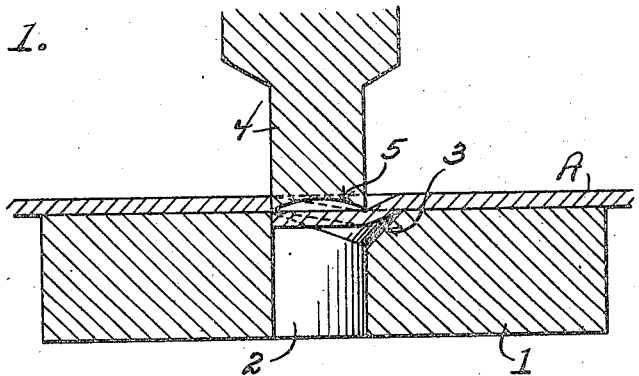
Figure 1 is a sectional view showing the first part of the punching operation for forming a hole and beveling the cutting edge of a tooth to be formed on a member.
Figure 2:
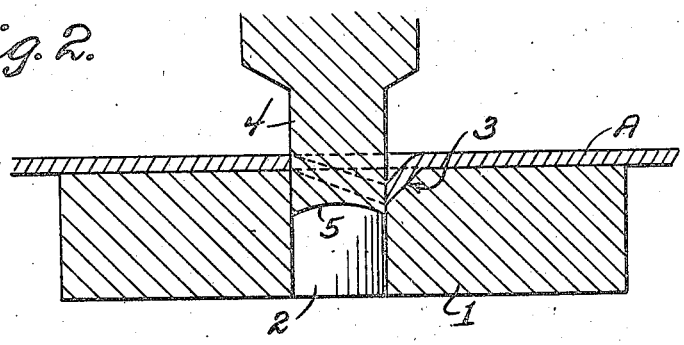
Figure 2 is a similar view showing the completion of the operation.
Figure 3:
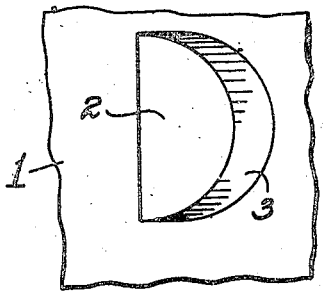
Figure 3 is a view of the hole and beveled part formed by the before mentioned operation.
Figure 4:
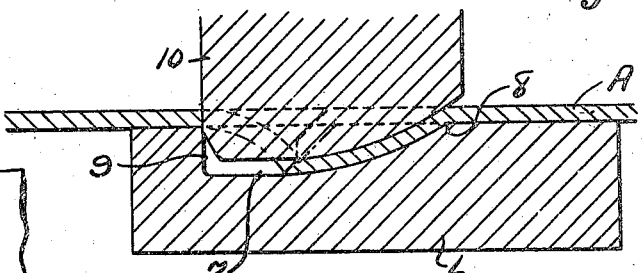
Figure 4 is a sectional view showing how the metal is pressed adjacent the hole previously formed therein to form the tooth.

As before stated, this invention relates primarily to the formation of the teeth and reinforced edges of a shredder device, such as that forming the subject matter of an application filed on October 21, 1929, Serial No. 401,269, though, of course, the invention is not limited to this use. The first step of forming each tooth in the metal plate A, which may be the body of the shredder, consists in placing the metal on a female die 1 having an opening 2 therein, the upper part of which is formed with a beveled enlargement 3. Then a punch 4, having a cutting edge 5, is forced through the metal into the opening 2, as shown in Figures 1 and 2. This cuts a hole in the metal and bends a portion of the metal over the beveled enlargement 3 and as the punch passes through the metal, it cuts that portion which is bent over the enlargement 3 at an angle, as shown in Figure 2, so that the wall of this bent portion is beveled. Then the metal is placed on a female die 6 having a recess 7 therein which gradually increases in depth from the point 8, where it merges into the top surface of the die to the straight wall 9, the recess being of curved shape in cross section. The male die 10 has its operative end oppositely formed so as to conform to the shape of the recess, and these dies press the metal adjacent the opening into a tooth forming portion of arc shape in cross section with its cutting edge terminating at the opening and as the metal is pressed by the dies, the bent part previously formed by the other two dies is straightened out into a part of the tooth forming portion and its edge is so positioned as to increase the bevel, as shown in Figure 4. Thus a raised part is formed on the metal sheet having a beveled edge terminating at the opening so as to form a tooth, as shown in the before mentioned application.

It is thought from the foregoing description that the advantages and novel features of the invention will be readily apparent.

It is to be understood that changes may be made in the construction and in the combination and arrangement of the several parts, provided that such changes fall within the scope of the appended claims.

What we claim is:—

1. The herein described method of forming teeth on a sheet of material consisting in punching a hole in the sheet and bending a portion of the sheet adjacent the hole at an angle so that that part of the wall of the hole in said bent portion is beveled, then pressing the sheet at one side of the hole outwardly beyond the plane of the sheet whereby the bent portion is further bent and forms part of the outwardly bent portion so as to produce a tooth having a beveled edge.

2. The herein described method of forming teeth in a sheet of material consisting in placing the sheet on a die having an opening therein, the upper end of which is formed with a beveled enlargement and then pressing the punching die through the metal into the opening, whereby a portion of the metal will be bent against the beveled enlargement and then the metal cut to provide an opening, the wall of which that is contained in the bent part being beveled and then placing the sheet between two other dies to press the metal at one side of the opening into a tooth, the cutting edge of which is formed by the before mentioned beveled wall of the opening.

In testimony whereof we affix our signatures.

ALBERT H. DIXON.
THOMAS SIMPSON ROBSON.
FERDINAND A. HENSCHELL.